United States Patent [19]

Yu

[11] Patent Number: 5,711,482
[45] Date of Patent: Jan. 27, 1998

[54] RESILIENT DISK DRIP IRRIGATION DEVICES

[76] Inventor: Michael Yu, 1270 Shakespeare Dr., Concord, Calif. 94521

[21] Appl. No.: 517,915

[22] Filed: Aug. 22, 1995

Related U.S. Application Data

[63] Continuation-in-part of Ser. No. 238,063, May 3, 1995, abandoned.

[51] Int. Cl.⁶ ............................. B05B 15/00; B05B 17/04
[52] U.S. Cl. ................................................. 239/11; 239/542
[58] Field of Search ................................. 239/542, 547, 239/533 B, 107, 106, 1, 11

[56] References Cited

U.S. PATENT DOCUMENTS

| | | | |
|---|---|---|---|
| 2,554,790 | 5/1951 | Miller | 138/43 |
| 3,273,803 | 9/1966 | Crowley | 239/457 |
| 3,777,980 | 12/1973 | Allport | 239/272 |
| 4,369,923 | 1/1983 | Bron | 239/542 |
| 4,718,608 | 1/1988 | Mehoudar | 239/542 |
| 5,279,462 | 1/1994 | Mehoudar | 239/542 |
| 5,294,058 | 3/1994 | Einav | 239/533.1 |
| 5,295,506 | 3/1994 | Smith | 137/271 |

FOREIGN PATENT DOCUMENTS

| | | | |
|---|---|---|---|
| 2614557 | 11/1988 | France | 239/542 |
| 1191027 | 11/1985 | U.S.S.R. | 239/542 |
| 1509002 | 9/1989 | U.S.S.R. | 239/542 |
| 8402828 | 8/1984 | WIPO | 239/542 |

Primary Examiner—Andres Kashnikow
Assistant Examiner—Robin O. Evans
Attorney, Agent, or Firm—Baker & Botts, L.L.P.

[57] ABSTRACT

Drip irrigation devices (10, 40, 90) to facilitate the flushing of the irrigation system are provided. The devices (10, 40, 90) include an upper body portion (12, 42, 96) having an intake passageway (24, 55, 106) and opening (56, 104), and a lower body portion (16, 46, 98) having a discharge passageway (29, 66, 106') and opening (76, 104). A floating or stationary disk (14, 44, 114) is positioned between the upper and lower body portions. During the flush cycle, the disk (14, 44, 114) oscillates with great energy to loosen debris and flushes particles and debris out of the irrigation lines. During the irrigation cycle, the disk provides pressure-compensated regulation of water flow to permit drops of water or solution to form.

11 Claims, 3 Drawing Sheets

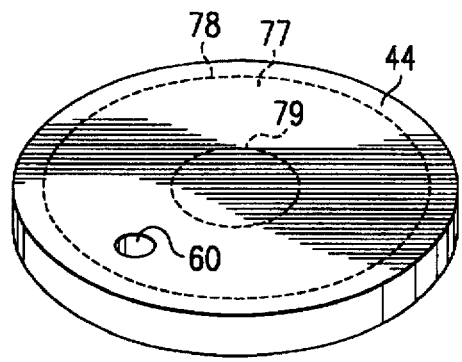
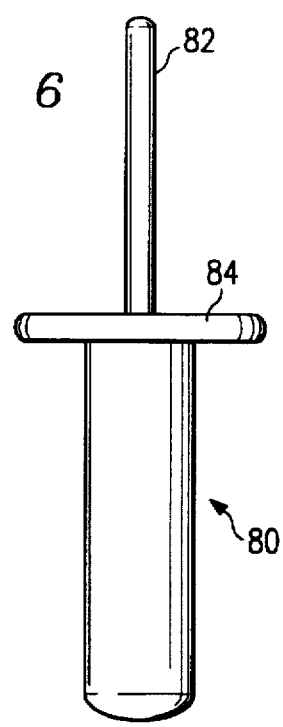
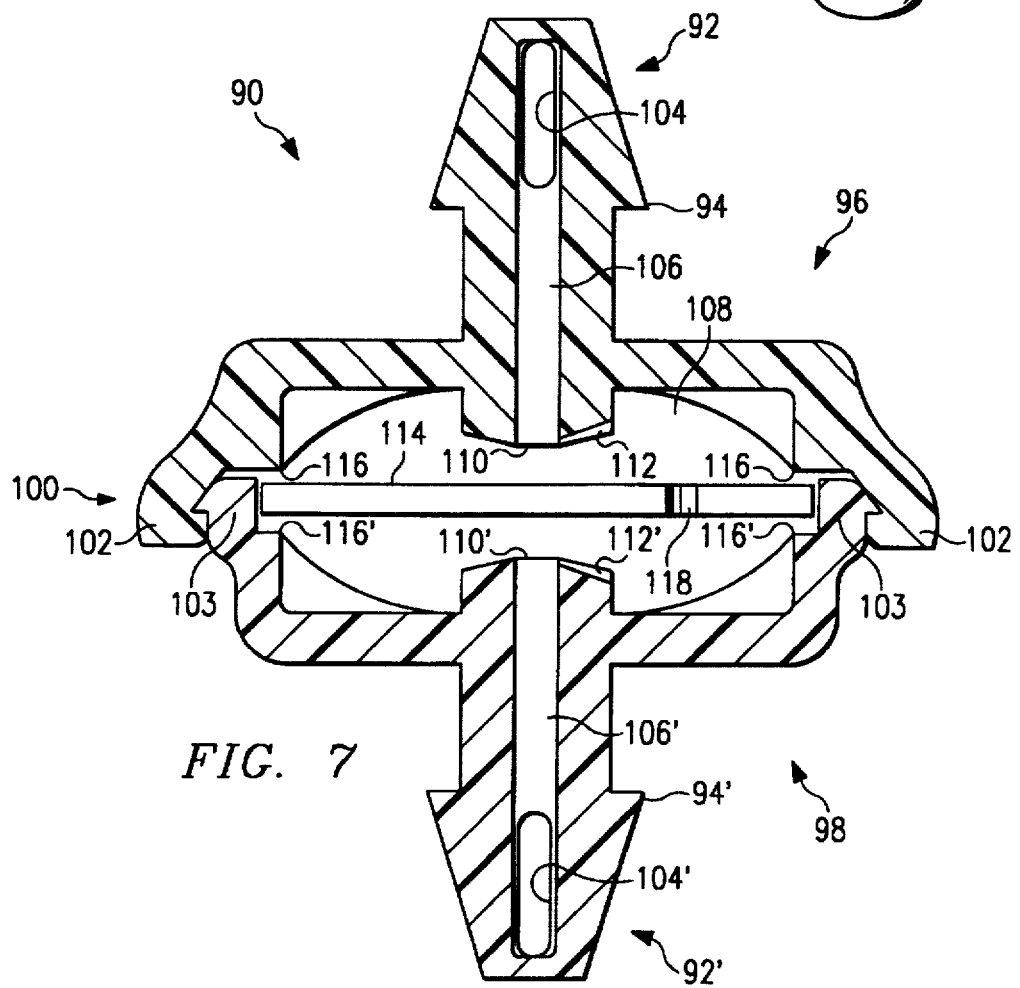

RESILIENT DISK DRIP IRRIGATION DEVICES

RELATED APPLICATIONS

This application is a continuation-in-part of U.S. application Ser. No. 08/238,063, filed May 3, 1995, and entitled "Resilient Disk Drip Irrigation Devices" by Michael Yu, now abandoned.

TECHNICAL FIELD OF THE INVENTION

This invention relates in general to the field of irrigation systems. More particularly, the present invention relates to resilient disk drip irrigation devices including a pressure-compensated self cleaning dripper and an automatic end flush.

BACKGROUND OF THE INVENTION

In the field of irrigation systems, the drip system has become one of the most widely used water delivery methods. The drip irrigation system is advantageous over other methods mainly because it delivers water and/or fertilizer only to those spots where it is needed. Not only is water consumption decreased, but the crop also benefits for a number of other reasons. Incidents of mildew and other undesirable fungus are discouraged since the water is only delivered to the feeder roots of each plant. Weeds in the field are also discouraged because surface soil is mostly dry. The drip system is especially preferred when the planting field is not level, such as a hillside.

In conventional drip systems, water is carried in drip hoses generally along rows of plantings. At the location of each plant, a dripper or drip head is inserted into the hose to form a conduit. The generally hollow dripper thus allows water to flow into the dripper and dispense the water one drip at a time. However, due to the relatively small discharge volume of the dripper, its water delivery passage and openings are prone to obstruction by sand, soil, debris, mineral deposits, algae and bacterial matter that have accumulated in the system. The concentration of foreign matter is the greatest at the start of each irrigation cycle due to accumulation between cycles when there is no water flow through the system. In addition, since a drip line has many valleys, bacteria and algae grows in the water accumulated in the valleys. The farm or orchard operator must therefore examine each dripper periodically to ensure each is function properly. If a plugged dripper is found, it must be removed from the hose to be cleaned or replaced. It is obvious that this an extremely time consuming process since a typical farming operation or orchard may use thousands of such drippers in its irrigation system.

When a conventional plugged or defective dripper is pulled from the irrigation line, the dripper intake anchor often enlarges and weakens the hole in the line. Repeated removal and reinsertion of drippers thus substantially weakens the integrity of the irrigation line. The effects of ultra-violet light from the sun further shortens the life of the irrigation system.

Some drippers in the market provide flushing capabilities, but they use many times more water during static flushing in comparison with the drip cycle. Therefore, these systems require an irrigation system with greater capacity and pipe sizes and a large amount of water in a short time, it is expensive, unfeasible and some times impossible when well water is used. The present invention has a resilient disk that creates an oscillating effect during the flush cycle. This works like a plunger and has a greater cleaning power. At the same time it discharges water in an on and off fashion so it uses much less water with better results. Usually it is not necessary to change under ground pipe size by using the present invention the resilient (floating) disk dripper.

Accordingly, there is a substantial need for a device that provides for automatic flushing of particles and drainage of water from the system to prevent obstruction of water delivery and dispensing. There is a further need for a dripper that facilitates the flushing and unplugging automatically without manually checking the irrigation lines in the field.

SUMMARY OF THE INVENTION

In accordance with the present invention, resilient disk drip irrigation devices are provided which substantially eliminate or reduce disadvantages and problems associated with prior drip irrigation systems. In one aspect of the present invention, drip irrigation devices to facilitate the flushing of the irrigation system are provided. The devices include an upper body portion having an intake passageway and opening, and a lower body portion having a discharge passageway and opening. A floating or stationary disk is positioned between the upper and lower body portions. The lower body portion, on the discharge side of the disk, is constructed in such a way as to produce a maximum amount of wet surface area on the disk. The wet surface area is defined as the surface area between the outer supporting ring and the ridge of the discharge sealing ring. The ratio of the large wet surface area compared with the small ridge surface area inside the discharge sealing ring, should be over 10 to 1. This basic structure combined with other configurations will allow the disk to oscillate at a predetermined operating parameter of water or solution pressure. The rapid oscillations, for example 10 to 15 cycle at 7 psi, work as a plunger to automatically clean the devices during the onset and end of the irrigation cycles when the water pressure falls into the operating parameter. The water discharging from the oscillation is not of a continuous flow but pulses, therefore it reduces the discharge volume drastically. This is extremely important if this dripper is used in a commercial farm, where one irrigation pump may be required to supply water to thousands of irrigation drippers simultaneously. If the flush cycle (clean cycle) has to use more than twice the amount of water in comparison with the drip cycle than the underground pipes, drip hoses, and pump size has to change to a larger size accordingly at substantial expense. Further, if the water is from a well, the surge of water supply may not be available.

In another aspect of the present invention, a drip line end flush device is provided. The device is used at the end of each irrigation line to facilitate the flushing of the irrigation system of foreign matter and drain out all excess water in the drip hose during the start up and end of irrigation when water pressure falls into the operating parameter. The device operates similarly in principle to that of a solenoid valve, which opens and closes at pre-set pressures. A drained and dry hose has less mineral, bacterial and algal buildup. Dry hoses also discourage wildlife from chewing on hoses to access water, resulting in a healthier and longer lasting drip system. If this device is mounted in a relatively high location in an irrigation pump station, it is also able to act as an economical air vent.

In yet another aspect of the present invention, a dripper is provided. The dripper employs a floating or stationary disk which oscillates at a low frequency at certain water pressures. The oscillatory motion of the disk functions as an agitator to loosen the foreign matter that may plug up water passageways in the dripper. Functioning in this manner, less water is required to loosen and flush the drippers. Plugged drippers may also be cleaned by inserting a round-headed push pin into the discharge to push the resilient disk away from the discharge sealing ring. If the irrigation water is at 35 psi after the pin is inserted at the right position, the resilient disk will oscillate approximately 40 cycles per second. This enormous oscillatory energy comes from the manually inserted pin and will easily break apart any organic debris and clean any amount of debris accumulated at the discharge slot.

An important technical advantage of the present invention is the substantial reduction of the required water flow to flush out the irrigation system of foreign matter and automatically drain the system of residual water. In addition, the individual dripper heads may be cleaned and flushed without detaching them from the irrigation hoses, a step that contributes to the aging and weakening of the hoses.

BRIEF DESCRIPTION OF THE DRAWINGS

For a better understanding of the present invention, reference may be made to the accompanying drawings, in which:

FIG. 5 is a top view of the floating disk;

FIG. 6 is a side view of a tool used with the floating disk dripper; and

FIG. 7 is a cross-sectional view of a two-headed dripper.

DETAILED DESCRIPTION OF THE INVENTION

Figure 1:
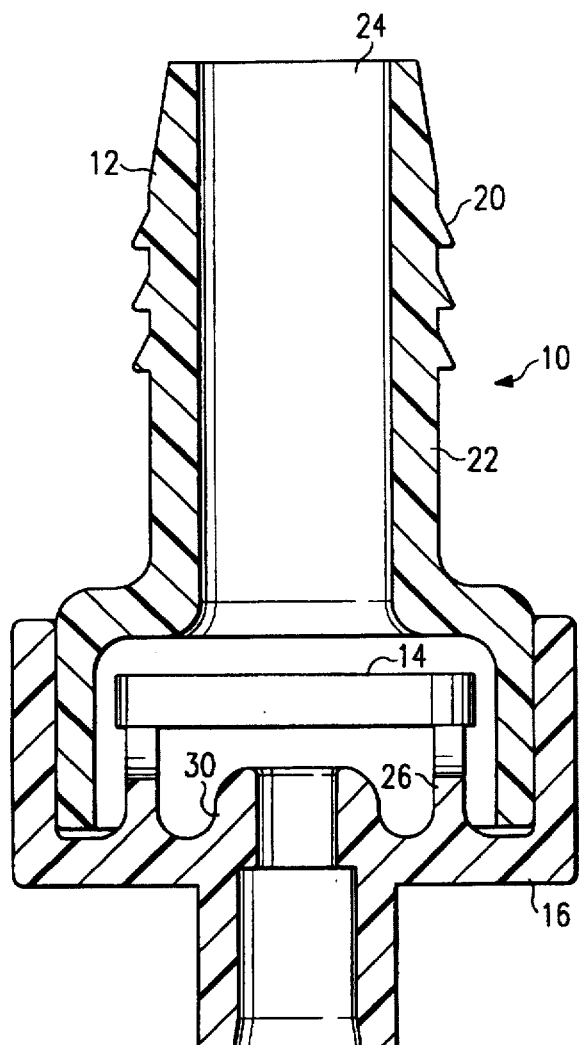
FIG. 1 is a cross-sectional side view of a preferred embodiment of a drip line end flush device.

Referring to FIG. 1, a cross-sectional view of a drip line end flush 10 is shown. The drip line end flush 10 includes three main body parts: an upper body portion 12, a resilient disk 14, and a lower body portion 16. The upper body portion 12 connects drip line end flush 10 to the end of an irrigation line (not shown). It includes one or more hose barbs 20 which provides a tight fit with the hose to prevent the disengagement of the device 10 and leakage of water. Barbs 20 may include individual ridges or circumvent the upper body portion 12 or a combination of both. Upper body portion 12 further includes a long neck 22 forming a water intake passageway 24. The long neck 22 allows insertion into the end of an irrigation line and the use of a hose clamp (not shown), if desired, to securely fasten it thereto. Upper and lower body portions 12 and 16 may be constructed of ABS, high density polypropylene, high density polyethylene, and other suitable materials.

The disk 14 may be constructed from flexible and resilient materials such as natural latex, EPDM, Viton, silicone, and any other material or combinations of materials of similar property or characteristics. The upper body portion 12 is assembled and adhered to the lower body portion 16 with the resilient disk 14 positioned therebetween perpendicular to the path of intake and discharge water flow as shown in FIG. 1. A glue, suitable cement, or other bonding agents may be used. Ultrasound welding, threaded fitting, or press-fitting may also be used to securely attach the two body portions 12 and 16.

Figure 2:
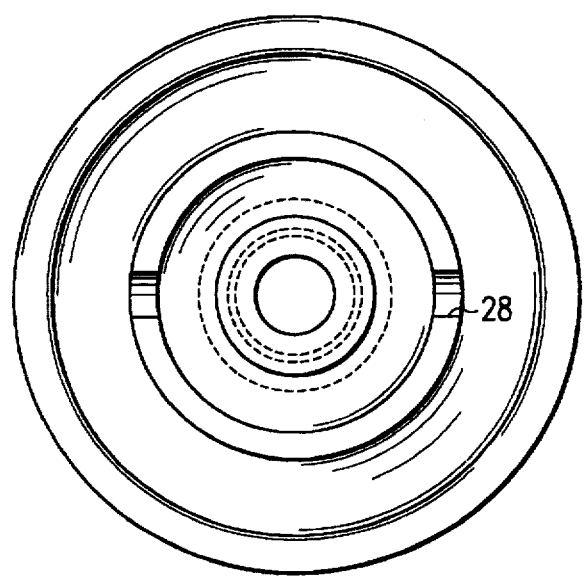
FIG. 2 is a cross-sectional top view of the lower body portion of the drip line end flush.

The lower body portion 16 includes a circular support column 26 on which the disk 14 sits. Referring also to FIG. 2, one or more slots 28 are formed in the circular support structure or column 26 to form a water-admitting passageway. This passageway permits the passage of water to a discharge opening 29. A single square slot will have a much larger opening to permit accumulated debris to discharge with water. The discharge passageway 29 is formed in the lower body portion 16 to provide the flushing of debris out of the irrigation line. Positioned at the opening of discharge passageway 29 is a discharge sealing ring 30. Note that the combined opening size of the slot or slots 28 is less than the size of either the intake passageway 24 or the discharge opening 29.

In operation, the resilient disk 14 behaves much like a solenoid valve, which automatically regulates the flow depending on the water pressure. The flush cycle takes place at the beginning of each irrigation cycle, when water enters and flows through the irrigation lines. The water thus flushes out debris accumulated in the lines. Debris and other accumulated matter are pushed to the end of the line and are freely discharged by the drip line end flush 10 through slot(s) 28 and discharge passageway 29.

As the water pressure increases, reaches and then exceeds a predetermined setting, for example four psi, the resilient disk 14 is pushed against the discharge sealing ring 30 thus effectively shutting off the water flow to the discharge opening 29. The flush cycle is completed. At the end of the irrigation cycle, the water pressure quickly drops and permits the resilient disk 14 to return to its original shape and position. Water still remaining in the irrigation lines may then be drained through the slot openings 28 and discharge opening 29. In the irrigation field, hundreds of the end flush 10 may be used in an irrigation system to prevent too much water from being discharged at the beginning of each irrigation cycle and overload the system. The present invention the end flush device 10, can control the slot 28 opening size to regulate the discharge volume, for example a 2.5 by 2.5 millimeter square slot will flush less than 5 gallons of water per hour during the initial irrigation. And the size 2.5 by 2.5 millimeter opening size generally is many times larger than the dripper's design, which allows larger accumulated debris to go through. In reality, the end flush also works like an air vent, inviting the pressurized water to rush toward the end flush. In practice it only takes a very short time to shut off the end flush device 10. More importantly, during end of the irrigation it will slowly (less than 5 gallons per hour) drain out all the water which is main purpose of the device. Slow draining is also quite important because it lessens the chance of a hole being blasted in the field.

The drip line end flush 10 may also employ a stationary disk 14 in place of the floating disk 14. The stationary disk 14 is positioned similarly but is attached to the supporting structure 26 at its perimeter. Mounted in this manner, the free center areas of the stationary disk 14 is able to move towards discharge sealing ring 30 at water pressures in a predetermined range and shutting off water flow through the device 10. Before the resilient disk 14 seals the discharge sealing ring 30, it creates a short burst of oscillation. This helps to clean out debris that may stick to the ridge of the discharge sealing ring 30 and cause leakage. The principle of the oscillation is same as the dripper 40, but some configurations may be different between the dripper and the end flush in order to accomplish different purposes and results. The end flush 10 has an outer disk support column 26, which enables the end flush 10 to have a much larger slot opening 28 than the hole 60 opening in the resilient disk 44 of the dripper to permit accumulated debris to discharge with the water. The parameter of performance, such as oscillation rate and at what pressure the discharge sealing ring 30 is sealed and reopened, can be controlled in the same manner as the dripper 40 design, which is explained below.

Figure 3:
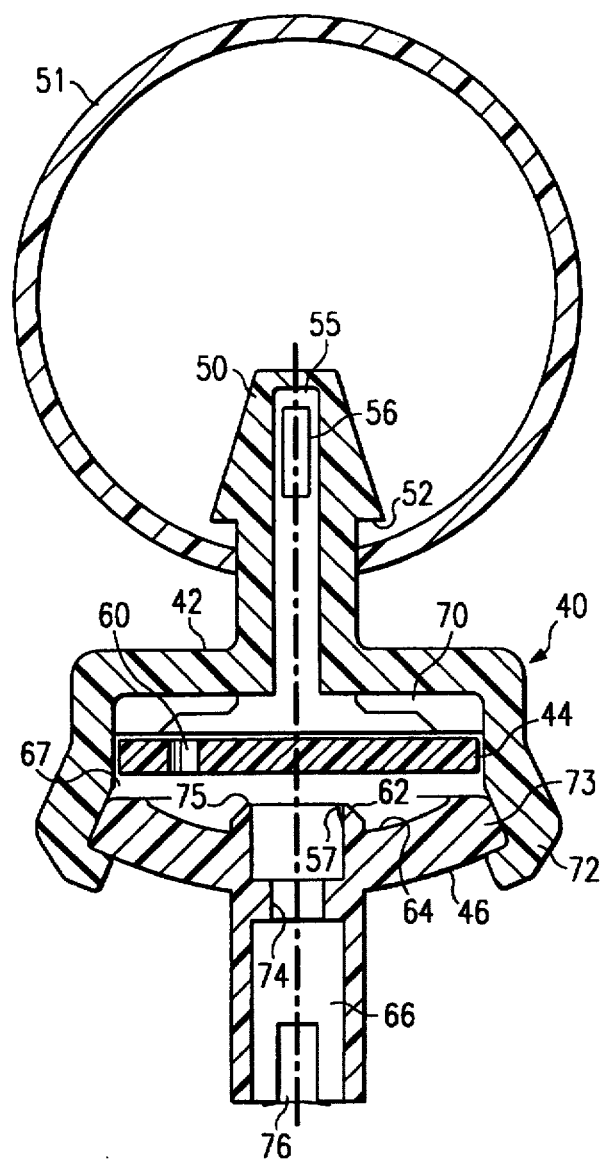
FIG. 3 is a cross-sectional side view of a preferred embodiment of a floating disk dripper.

Referring to FIG. 3, a cross-sectional view of a floating disk dripper 40 is shown. The floating disk dripper 40 includes an upper body portion 42, a floating disk 44, and a lower body portion 46. The upper body portion 42 includes a piercing head 50 that may be inserted into a pre-drilled opening on the side of a drip hose 51. The piercing head 50 includes an anchoring barb or flange structure or anchor 52 which securely anchors against the inner wall of the hose 51 to prevent the dislodging of the dripper 40 by mounting water pressure. The piercing head 50 further forms an intake passageway 55 which channels the water or other solutions (for solution mining) from the hose 51 into the dripper 40. At least two outlets 56 are formed in the side of the water passageway 55 to allow water to enter into the passageway 55. The upper body portion 42 further houses the floating disk 44, which is positioned substantially perpendicularly to the intake passageway 55 in the cavity or chamber formed between the upper and lower body portions 42 and 46. The upper and lower body portions 42 and 46 may be constructed of Acetal (or Delren manufactured by Dupont) or suitable materials with memory.

The floating disk 44 is also constructed of a flexible and resilient material which also should be chemical resistant such as natural latex, a polybutadiene compound, EPDM, Viton, silicone, and any other material of similar property or characteristics. Referring also to FIG. 5, it may be seen that one or more openings 60 (a single hole opening is preferred to allow larger debris to pass through) are formed in the floating disk 44 a predetermined distance from the perimeter to permit the passage of water from the upper body portion 42 to the lower body portion 46. A wet surface area 77 is further defined on the disk 44. The wet surface area 77 is defined as the surface area between two concentric circles 78 and 79 projected thereon by the supporting outer ring 67 and the discharge sealing ring ridge 75, respectively. When the disk 44 is pushed against the discharge sealing ring ridge 75 and the supporting outer ring 67, and the floating disk 44 almost seals the discharge 66, at this split second, the water pressure at the discharge side is no longer at atmospheric pressure. The wet surface area at the discharge side has the same water pressure as the intake side, because the same pool of water connects the intake and discharge sides through the opening 60 on the disk.

The lower body portion 46 forms a discharge sealing ring 62 at the opening of a discharge passageway and opening 66. The discharge sealing ring 62 further defines a narrow ridge 75. The floating disk 44 is positioned in a cavity formed by a reinforcing structure 70 defined by the upper body portion 42 and a supporting structure 73 defined by the lower body portion 46. The supporting structure 73 further defines a supporting outer ring 67, which is the highest point when measured from the discharge sealing ring ridge 75. In this floating position, the disk 44 is spaced from the discharge sealing ring 62 and the discharge passageway 66 is unobstructed. It may be seen that a stationary disk 44 may also be employed to produce substantially the same function. Such a disk may be mounted and bonded to the supporting structure 73 at its outer perimeter. Supporting structure 73 may be pressed to fit within a clamping structure 72 formed in the upper body portion 42.

Figure 4:
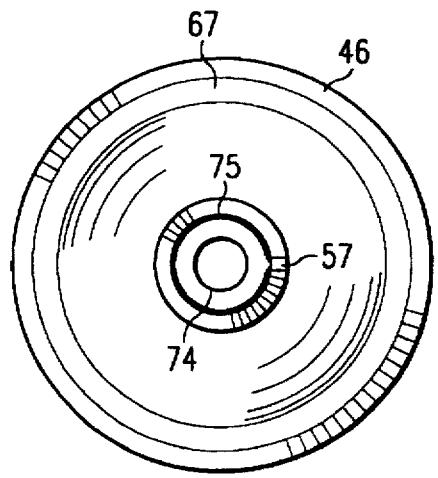
FIG. 4 is a top view of a portion the floating disk dripper.

Referring also to FIG. 4 for a top view of the lower body portion 46, along the inner perimeter of discharge sealing ring 62, a minute slot 57 is formed. Slot 57 permits a small amount of water to escape to the discharge passageway 66 when the discharge opening is substantially obstructed by the floating disk 44. A deflector ring 74 is further formed in the discharge passageway 66 to form droplets of water or solution from the small stream of mist-like high velocity water escaping through the slot 57. The principal is to change the directional small stream of water (mist) to a pool of turbulent water before it passes through the deflector ring 74. In this way, most of the energy is dissipated. After passing the deflector ring 74, the opening size once again is enlarged, which also contributes to absorbing the excess energy from the discharge water. To condense the high velocity mist to water drops is a very important part of the design. If this is not achieved, the dripper has no practical usage, the discharge mist will shoot distance away from designated plant to be watered, and most of the water will turn into vapor or be carried away by the wind. Today most drippers use pressure reducing principal, which guide the water through a maze and drastically reduce water pressure before it reaches discharge. Even at low discharge pressure a cap over the discharge or a shield build in the discharge has often been used. The functions of these structures will be apparent from the description of the operation of the float disk dripper device 40. The stopper-flushing tool 80, as shown in FIG. 6, is provided to facilitate the flushing of the dripper 40, the function of which is described in more detail below.

In operation, the piercing head 50 of the floating disk dripper 40 is inserted into a pre-drilled opening of appropriate size in a drip irrigation hose 51. The dripper 40 is then firmly anchored in place by the anchor 52. To facilitate the description of the operation of the dripper 40, the side of the disk 44 facing the upper body portion 42 is the "intake side" and the other side facing the lower body portion 46 is the "discharge side."

During beginning of the irrigation, water enters the irrigation hose 51 and the dripper 40 through intake passageway 55. The initial water pressure will push the floating disk 44 against the supporting outer ring 67 and positioned spaced from discharge sealing ring 62. Water thus flows freely through the one or more openings 60 in the disk 44 and exits through the discharge passageway and opening 66. Some debris and foreign matter accumulated in the hose 51 or dripper 40 may be flushed out by this initial surge of low pressure of water supply.

As water pressure increases, to two or three psi for example, the pressurized water pushes against the intake side of the resilient disk, and pushes it firmly against the supporting outer ring 67. The opening 60 on the resilient disk 44 allows the water to pass through to the discharge side of the resilient disk 44. Because the hole 60 size on the disk 44 is smaller than the water intake passageway diameter 55, the water pressure builds up at the intake side of the resilient disk 44. At this moment the discharge side of the resilient disk 44 is open to the atmosphere because the discharge passageway is not yet blocked. When the water pressure at the intake side of the resilient disk 44 reaches a higher pressure than the resilient disk 44 deflection rate, the resilient disk 44 starts to cave in toward the discharge side and push against the discharge sealing ring ridge 75. The sealing ring ridge 75 is lower than the outer supporting ring 67 with the vertical distance therebetween at approximately 0.8 to 1.2 millimeters, for example.

The discharge slot 57 in the ridge 75 permits a small amount of water to discharge and form drops of water. When the water pressure increases, the pressure pushes the resilient disk 44 further against the ridge 75 resulting in a reduction in the slot opening size. When the pressure decreases, the slot opening size increases. The result is a nearly constant discharge volume, making dripper 40 a pressure-compensated dripper.

Before the resilient disk 44 is pushed against the discharge sealing ring ridge 75, the discharge side of the resilient disk 44 is at atmospheric pressure, because it is open to the atmosphere through the outlet. After the resilient disk 44 is pushed against the discharge sealing ring ridge 75 and almost seals the discharge sealing ring ridge 75, the water continues to pass through the off-center opening 60 in the disk 44 and joins the body of water on the discharge side of the disk 44 until the water pressure exerted against the wet surface 77 of the resilient disk 44 instantly equalizes with the water pressure at the intake side. This creates a surge of energy at the discharge side of the resilient disk 44.

The sudden surge of energy or water pressure at the discharge side exerted on the wet surface area, in addition to the disk deflection rate (the disk deflection rate must be greater than the water pressure applied on the intake side at the area of discharge sealing ring ridge 75 surface) suddenly make the total energy (water pressure plus resilient disk deflection rate) at the discharge side greater than the water pressure of the intake side. This sudden change will allow the resilient disk 44 to bounce back toward its original central position and unload its tension. Suddenly the discharge side of the resilient disk 44 is open to the atmosphere, and the discharge side water pressure is instantly reduced to atmospheric pressure again. The resilient disk 44 is therefore once again being pushed toward the discharge ridge 75. This action is repeated and creates an oscillatory motion or plunging effect until the conditions change over or are below the operating parameters.

The duration and parameters of the oscillation, the frequency of the oscillation and the wave length, all performances can be controlled by preset conditions. The major element is the deflection rate of the resilient disk 44, water pressure, the hole 60 size of the resilient disk 44, the ratio of hole 60 size of the resilient disk 44 to the intake passageway 55, and the vertical distance between the supporting outer ring 67 and the discharge sealing ring ridge 75. Most important is the proportion of the wet surface 77 area to the surface area of the discharge sealing ring ridge 75. The ratio should be over 10 to 1. The narrow ridge 75 at the discharge sealing ring 62 is also an important design to provide a better sealing. If a wide sealing surface is used it may not be able to efficiently harvest the minute energy stored in the resilient disk, the oscillation effect will be damped.

The rapid oscillations work as a plunger to automatically clean the dripper during the onset and end of irrigation cycles when the water pressure falls into the operating parameter.

Drippers may be designed specifically for agricultural use. Since water pressure used in drip irrigation on farms generally ranges from 15 to 35 psi, for example the present design enables the resilient disk 44 to oscillate when the water pressure ranges from 2 to 7 psi. At 7 psi the oscillating speed ranges from approximately 10 to 15 cycles per second. When the water pressure is over 7 psi, the cleaning cycle ends. At this time the deflection rate of the disk will no longer be able to override the water pressure from the intake side, which pushes the disk against the sealing ridge 75, but the amount of water pressure is only equivalent to the surface area inside the concentric circle of the discharge sealing ridge 75 (does not include the wet surface 77, because the pressure at the wet surface should be equal at both sides of the disk). Then the disk 44 will press against the discharge sealing ridge and will no longer be able to rebound. The drip cycle begins.

If the dripper 40 is for home use or is used in solution mining, the water pressure is generally higher. In these cases, the parameters may be adjusted accordingly.

During the irrigation cycle, a plugged dripper 40 may be flushed by the use of the stopper-flushing tool or push pin 80, an embodiment of which is shown in FIG. 6. The slender end 82 of the tool 80 is adapted for insertion into the discharge passageway 66 and reaching the disk 44. By using the tool 80, the disk 44 may be pushed away from the discharge sealing ring ridge 75, the distance (length of the pin) of insertion should be set approximately half way between the discharge sealing ring ridge 75, and outer supporting ring 67 in a vertical position. The purpose of inserting a pre-manufactured round-headed pin into the discharge is to give the farmer the ability to manually unclogs the dripper on the spot with little effect, unlike conventional methods in which you have to pull the dripper out from the hose to repair or exchange it. It could tear the hole opening on an aged brittle plastic drip hose. This will shorten the life span of the drip hoses. If the irrigation water is at 35 psi after the pin is inserted at the right position, the resilient disk will oscillate approximately 40 cycles per second. This enormous energy comes from manually inserting a pin and will easily break apart any organic debris and clean any amount of debris accumulated at the discharge slot 57. When the stopper flushing tool 80 is fully inserted in position, the stopper 84 blocks the discharge, then the two sided slot opening 76 will take over the discharge function. The principal of the rapid oscillation is the same as in the dripper design, after the disk 44 has been pushed away by the push pin 80 from the discharge sealing ring ridge 75, it has to allow the resilient disk 44 to reseal (almost) the ridge 75, and reopen it in a fraction of a second. If the pin is inserted too far and beyond a certain limit, the disk is not able to seal (almost) the discharge sealing ring ridge 75. The oscillation will then stop immediately.

When the pin 80 is used at a higher water pressure, more force is required to push the disk 44 away from the discharge sealing ring ridge 75. This further stretches the resilient disk 44 and extends its elastic tension, thus adding to the deflection energy which causes the rapid oscillation. A higher deflection rate with higher water pressure will have a higher oscillation frequency. If the disk 44 is made from a full hard metal (such as spring steel) it will not be able to stretch by pushing, and this result will not occur.

The dripper 40 has the same general configuration, principle, and uses the same method as the end flush 10. Because the end flush 10 is inserted at the end of the drip hose 51, and the dripper 40 is inserted through the side of the drip hose, the appearance is quite different. The dripper 40 requires a longer duration of oscillation for a greater cleaning effect than the end flush 10, because of that, the set up is slightly different, but the principle and process method are the same. The end flush 10 requires a greater volume of water and larger debris are able to go through it then the dripper, because of that it uses a larger discharge slot opening 28 (2.5×2.5 millimeter) at the supporting ring 26, instead of using a smaller hole opening 60 (approximately 1.2 millimeter in diameter) in the disk 44. The end flush 10 has no drip cycle, the slot opening in the sealing ring 30 is also not needed.

Referring to FIG. 7, a two-headed resilient disk drip irrigation device 90 is shown. Two-headed dripper 90 has two "heads" 92 and 92', both capable of being inserted into a pre-drilled opening made in a hose (not shown). Both heads 92 and 92' include anchoring barbs 94 and 94' to securely anchor against the inside wall of the hose. The dripper 90 are constructed of two half portions 96 and 98, which are securely fastened together by a clamping structure 100, including clamp 102 and mating clamp 103 formed in the half portions 96 and 98, respectively.

Both heads 92 and 92' define side openings 104 and 104' (one on each side of the passageway) connected to a water passageway 106 and 106' which lead into a water chamber 108 formed between the two half portions 96 and 98. The water passageways 106 and 106' protrude a predetermined distance into the water chamber 108 and form a sealing ridge 110 and 110' around the mouth of the water passageways 106 and 106' at the point the water in the passageway 106 and 106' enter into the chamber 108 from the chamber 108. A slot 112 and 112' is formed in the sealing ridge 110 and 110', respectively.

A disk 114 is housed in the chamber 108 with its outer edge positioned between supporting outer rings 116 and 116' in the two half portions 96 and 98, respectively.

The material used to construct the two-headed dripper 90 is like that described above in the end flush 10 and dripper 40 embodiments. The two-headed dripper 90 also operate in a similar manner. However, because it effectively has two inlets and two discharge outlets, if the dripper 90 is blocked by larger particles that cannot be flushed out, the two-headed dripper 90 may simply be reversed by pulling the dripper from the hose and reinserting the other "head" into the hose. The opposite side of the discharge is a separate identical portion of the unit it should be free from being plugged up. The debris and particle blocking the dripper 90 are then easily flushed out with the reversed direction of the water therethrough. Therefore, the two-headed dripper 90 can always be cleared out and unplugged by reversing the intake and the outlet.

Furthermore, the slots 112 and 112' on the sealing ridge 110 and 110' may be sized differently so that the discharge volumes of the two sides are different. For example, the slot opening 112 may discharge half a gallon per hour and the slot opening 112' may discharge one gallon per hour when used as the discharge. The dual discharge rates makes the two-headed dripper 90 ideal for home use and contractors and reduces inventory at the retail level.

Although the present invention has been described in detail, it should be understood that various changes, substitutions and alterations can be made thereto without departing from the spirit and scope of the present invention as defined by the appended claims.

What is claimed is:

1. A method for drip irrigation comprising the steps of:
installing an inlet of a drip irrigation device into an irrigation hose, said inlet defining an intake passageway;
initiating a flush cycle by providing a surge of water in said irrigation hose, generally from starting the irrigation pump, entering said intake passageway and a chamber housing a floating resilient disk being supported by an outer support ring, said disk having an intake side and a discharge side;
permitting the water to flow through at least one off-center opening defined in said floating resilient disk and flushing debris accumulated in said drip irrigation device out through a discharge passageway;
increasing water pressure at said intake side of said disk to a first predetermined range and pushing said floating resilient disk to deflect and butt up against a discharge sealing ring positioned in said chamber at an entrance of said discharge passageway;
continuing to permit water to flow through said at least one off-center opening in said disk and attaining a discharge side water pressure at the wet surface area instantly equalizing with the intake side water pressure;
permitting said floating and resilient disk to harvest the energy stored in its deflected form and the increased water pressure at said discharge side and suddenly rebound away from said discharge sealing ring and substantially back to its neutral position and opening said discharge passageway to atmospheric pressure; and
again permitting said disk to deflect and be pushed against said discharge sealing ring by incoming water, causing a continuous oscillating motion in said disk thereby loosening any accumulated debris lodged in said device and flushing the debris out through said discharge passageway.

2. The drip irrigation method, as set forth in claim 1, further comprising the steps of:
further increasing the water pressure at said intake side to a second predetermined range to initiate a drip cycle, said increased water pressure stopping said disk oscillating motion and pushing said disk against said discharge sealing ring; and
permitting water to exit said chamber through a small slot in said discharge sealing ring and said discharge passageway in a pressure-compensated manner.

3. The drip irrigation method, as set forth in claim 1, further comprising the step of inserting a push pin into said discharge passageway to push the disk away from said discharge sealing ring to further flush out the device.

4. The drip irrigation method, as set forth in claim 2, further comprising the step of deflecting water exiting through said small slot in said discharge sealing ring and converting the water to droplets, by passing through the deflector ring in said discharge passageway.

5. The drip irrigation method, as set forth in claim 4, wherein said step of inserting said push pin includes the step of inserting a rounded tip of said push pin half the vertical distance between said outer supporting ring and said discharge sealing ring.

6. The drip irrigation method, as set forth in claim 4, wherein said step of inserting said push pin further includes the step of causing said oscillating disk to oscillate at a greater frequency.

7. The drip irrigation method, as set forth in claim 2, further comprising the step of decreasing said water pressure to said first predetermined range, and reinitiating oscillating motion in said resilient disk.

8. The drip irrigation method, as set forth in claim 7, further comprising the step of further decreasing said water pressure to below said first predetermined range and allowing said disk to be in a neutral position spaced from said discharge sealing ring and intake passageway, thereby permitting fluids to quickly and thoroughly drain from said drip irrigation device.

9. A method for drip irrigation comprising the steps of:
allowing water having a predetermined water pressure to enter an intake passageway and a chamber of a drip irrigation device, the chamber housing a floating resilient disk being supported by an outer support ring, the resilient disk having an intake side and a discharge side;
increasing the water pressure at the intake side to a first predetermined range and pushing the resilient disk to deflect and butt up against a discharge sealing ring positioned in the chamber at an entrance of the discharge passageway;

permitting the water to flow through a slot opening in the outer support ring and attaining a discharge side water pressure to instantly equalize with the intake side water pressure;

permitting the resilient disk to harvest the energy stored in its deflected form and the increased water pressure at the discharge side and to suddenly rebound away from the discharge sealing ring and substantially back to its neutral position and thus opening the discharge passageway to atmospheric pressure; and again permitting the resilient disk to deflect and be pushed against the discharge sealing ring by incoming water, causing a continuous oscillating motion in the resilient disk thereby loosening any accumulated debris lodged in said device and flushing the debris out through said discharge passageway.

10. The drip irrigation method, as set forth in claim 9, further comprising the steps of:

further increasing the water pressure at the intake side to a second predetermined range to initiate a drip cycle, the increased water pressure stopping the disk oscillating motion and pushing said disk against the discharge sealing ring; and permitting water to exit the chamber through a small slot in the discharge sealing ring and the discharge passageway in a pressure-compensated manner.

11. The drip irrigation method, as set forth in claim 10, further comprising the step of deflecting water exiting through the small slot in the discharge sealing ring and converting the water to droplets, by passing through the deflector ring in the discharge passageway.

* * * * *

UNITED STATES PATENT AND TRADEMARK OFFICE
CERTIFICATE OF CORRECTION

PATENT NO. : 5,711,482
DATED : January 27, 1998
INVENTOR(S) : Yu

It is certified that error appears in the above-identified patent and that said Letters Patent is hereby corrected as shown below:

Title page item [63], delete "May 3, 1995" and insert -- May 3, 1994 --.

Signed and Sealed this

Twenty-eighth Day of April, 1998

Attest:

BRUCE LEHMAN

*Attesting Officer*

*Commissioner of Patents and Trademarks*